United States Patent [19]

Schafer

[11] 4,164,154

[45] Aug. 14, 1979

[54] TRANSMISSION FOR TWO-WORM PRESS WITH COUNTER RUNNING WORMS

[75] Inventor: Heinrich Schäfer, Vellmar, Fed. Rep. of Germany

[73] Assignee: Thyssen Industrie Aktiengesellschaft, Essen, Fed. Rep. of Germany

[21] Appl. No.: 836,480

[22] Filed: Sep. 26, 1977

[30] Foreign Application Priority Data

Sep. 25, 1976 [DE] Fed. Rep. of Germany ... 7630036[U]

[51] Int. Cl.[2] .......................... F16H 37/06; F16H 1/18
[52] U.S. Cl. ................................ 74/665 GD; 74/424.5
[58] Field of Search ......... 74/412 R, 421 R, 665 GA, 74/665 GD, 665 G, 424.5

[56] References Cited

U.S. PATENT DOCUMENTS 3,359,826 12/1967 Hanslik .......................... 74/421 R X
3,969,956 7/1976 Hanslik ........................... 74/665 GD

*Primary Examiner*—Leonard H. Gerin
*Attorney, Agent, or Firm*—Walter Becker

[57] ABSTRACT

A transmission for a two-worm press having counter running worms in a worm housing, which includes: a transmission housing, an additional housing connected to the transmission housing and detachably connectable to the worm housing, a first and second transmission output shaft respectively having different length and being supported by axial bearings and drivingly connectable to the worms by means of splined coupling sleeves. The first one of the two transmission output shafts has its free end designed for positive torque transmision and extends into a correspondingly designed hub-shaped end of an additional output shaft forming part of a step-down transmission and being arranged in the transmission housing. The two transmission output shafts are supported by radial bearings spaced from each other and from the additional output shaft. Each of the two transmission output shafts has a gear keyed thereto between the radial bearings while the two gears are in mesh with each other. The free shaft end of the second one of the two transmission output shafts is journalled in an axial bearing unit located in the additional housing.

6 Claims, 1 Drawing Figure

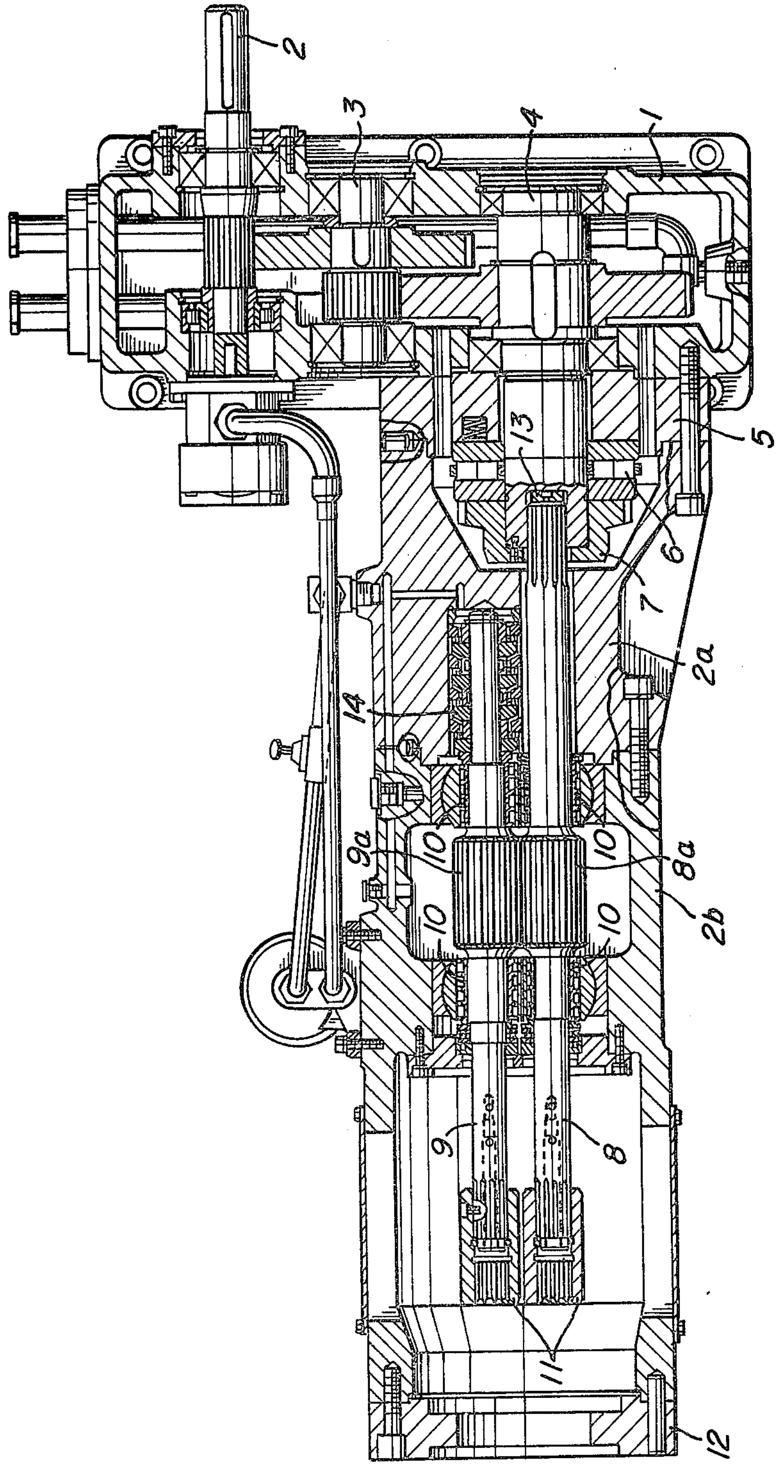
2
3
4
1
5
13
6
7
2a
14
10
9a
8a
2b
9
8
11
12

TRANSMISSION FOR TWO-WORM PRESS WITH COUNTER RUNNING WORMS

The present invention relates to a transmission for a two-worm press with counter-running worms, which comprises a transmission housing screwed onto the worm housing and furthermore comprises transmission output shafts supported by axial bearings, said transmission output shafts being nonrotatably connected to the worms by means of splined coupling sleeves. Transmissions for two-worm presses with counter-running worms are known according to which the gears required between driving motor and worms for reducing the speed, are arranged in a single transmission housing. The axial forces of the two worms are transmitted to the axial bearings through the intervention of axially displaceable transmission output shafts. The said axial bearings are arranged on that side of the transmission housing which faces away from the worm housing. The worm back pressure forces are returned from the axial bearing to the worm housing by means of tie rods which on one hand are connected to the housing on the axial bearing, and on the other hand are connected to the worm housing, said tie rods being passed in a contact-free manner through the transmission housing.

These known transmissions have the drawback that with regard to dimensions and arrangements of the gears, especially in the transmission end-stage on the side of the worms, are each time designed only for a very definite distance between the worms and for a definite permissible torque load, so that these transmissions from one-purpose transmissions inasmuch as they cannot be used for different distances between the worms and for higher torques differing from their original specific design.

It is, therefore, an object of the present invention so to design a transmission for two worm presses with counter-running worms, that the transmission with minor changes can be made to meet different requirements with regard to the distance between the worms and with regard to an admissible torque.

These and other objects and advantages of the invention will appear more clearly from the following specification in connection with the accompanying drawing illustrating a longitudinal section through the transmission according to the invention.

The transmission for a two-worm press with counter-running worms according to the present invention is characterized primarily in that a transmission output shaft has its free end designed as shaft end for positive torque transmission, and extends up to the abutment at the end face into the correspondingly designed hub end of of an output shaft of a step-down transmission which output shaft is provided with a preceding axial bearing. The said transmission output shaft is between the radial bearings provided with teeth which mesh with teeth of equal size of a second transmission output shaft. The axial bearing provided at the free shaft end of the second transmisson output shaft is arranged in the transmission housing for the two transmission shafts, said transmission housing being connected on one hand to the worm housing and on the other hand to the transmission housing of the step-down transmission housings of the step-down transmission.

In order in this connection to keep the load on the axial bearing of the transmission output shaft driven by said teeth as low as possible, it is provided that the teeth of the transmission output shafts are designed as helical teeth. The angle of skew is so selected that the axial force component from the torque transmission of the transmission output shaft driven by said helical teeth is directed opposite to the back pressure force of the worm driven thereby.

In order to be able with the driven two-worm press to set the play between the adjacent worm flanks, the present invention furthermore provides that between the engaging surface on the end face of the hub end of the output shaft of the step-down transmission on one hand and the shaft end of the transmission output shaft positively connected thereto on the other hand there is provided a synchronizing plate.

The FIGURE illustrates a transmission for a two-worm press.

Referring now to the drawing in detail showing a horizontal section through a transmission for driving two-worm presses, it will be seen that in the transmission housing 1 of a step-down transmission with non-illustrated gears there are journalled the drive shaft 2, an intermediate shaft 3, and an output shaft 4. At that output side of the stepdown transmission which points to the worm housing of a non-illusttated two-worm press, there is arranged an intermediate plate 5 on which rests the axial bearing 6 of the output shaft 4 which axial bearing 6 is provided for absorbing worm back pressure forces. The output shaft 4 rests through a bell 7 upon the axial bearing 6. The free shaft end of the output shaft 4 is on the inside designed as hub for a positive torque transmission such as a splined profile, short teeth, or groove-key connection. When employing this transmission for driving one-worm presses, the correspondingly designed end of the worm extends into said hub. When employing the above described transmission for driving two-worm presses, the intermediate plate is followed by the housing of an additional transmission which housing comprises two housing sections 2*a* and 2*b*. Journalled in radial bearings 10 in said additional transmission is a longer transmission output shaft 8 and a shorter transmission output shaft 9 which are spaced from each other by a distance equalling that of the non-illustrated worms. The transmission output shafts 8 and 9 have those ends thereof which are located at the side of the worms provided with splined coupling sleeves 11 by means of which they are nonrotatably connected to the driving ends of said worms. The non-illustrated worm housing is in the specific embodiment shown by way of example in the drawing, by means of an intermediate plate 12 connected to the housing section 2*b* of the additional transmission. However, the connection may also be effected without the said intermediate plate. The transmission output shafts 8 and 9 are provided with inclined teeth 8*a* and 9*a* respectively which mesh with each other so that the shorter transmission output shaft 9 is driven by the longer transmission shaft 8 which has its free end provided with a follower profile extending into the hub of the output shaft 4. In order to be able between the flanks of the two worms to obtain the play necessary in operation, the bottom of the hub is provided with a synchronizing disc 13 against which rests the transmission output shaft 8 during the transmission of the back pressure forces of the worm driven by said transmission output shaft 8. The transmission output shaft 9 rests at that end thereof which faces away from the worm, on an axial bearing unit composed of a plurality of serially arranged axial bearings 14 which are arranged in the housing section 2*a* of the additional transmission. In view of the longer transmission output shaft 8, the available installation play for the axial bearing of the transmission output shaft 9 is greatly narrowed. In order therefore to keep the load on said axial bearing exerted by the back pressure force of the worm driven by shaft 9 as low as possible, the direction or inclination of the inclined or helical teeth 8*a*, 9*a* are so selected that with the transmission output shafts 9 driven through the inclined teeth, the axial component from the torque transmission of the back pressure force is directed to the component of the worm driven thereby.

As will be evident from the above, the advantage obtained by the present invention consists primarily in that mass produced step-down transmissions for one-worm presses can by the addition of an additional transmission be employed with two transmission output shafts journalled therein as transmission for two-worm presses. In this connection merely the spacing between the axes of the transmission output shafts of the additional transmission are to be adapted to the distance between the worms.

It is, of course, to be understood that the present invention is, by no means, limited to the specific showing in the drawing, but also comprises any modifications within the scope of the appended claims.

What I claim is:

1. A transmission for a two-worm press having counter running worms in a worm housing, which includes: a transmission housing, an additional housing connected to said transmission housing and detachably connectable to the worm housing of a worm press, only a first transmission output shaft and a second transmission output shaft rotatably journalled in said additional housing respectively having one end drivingly connectable to two worms of a worm press, only one additional output shaft rotatably arranged in said transmission housing and forming part of a transmission and being drivingly connected to one of said first and second transmission output shafts, and an axial bearing unit located in said additional housing and externally journalling the free end of the other one of said first and second transmission output shafts.

2. A transmission for a two-worm press having counter running worms in a worm housing, which includes: a transmission housing, an additional housing connected to said transmission housing and detachably connectable to the worm housing of a worm press, a first and a second transmission output shaft rotatably journalled in said additional housing respectively having one end drivingly connectable to two-worms of a worm press, an additional output shaft rotatably arranged in said transmission housing and forming part of a transmission and being drivingly connected to one of said first and second transmission output shafts, and an axial bearing unit located in said additional housing and journalling the free end of the other one of said first and second transmission output shafts, one of said first and second transmission output shafts representing a driving shaft whereas the other one of said first and second transmission shafts represents a driven shaft driven by said driving shaft, and gears respectively keyed to said first and second transmission output shafts and meshing with each other, said gears having inclined teeth the angle of inclination of which being such that the axial force component of the torque transmission of said driven transmission output shaft is directed opposite to the back pressure force exerted upon said driven transmission output shaft by the worm to be driven by said last mentioned output shaft.

3. A transmission according to claim 2, which includes an intermediate plate interposed between and connected to said transmission housing and said additional housing, an additional axial bearing supported by said intermediate plate for absorbing axial forces exerted upon said driving shaft of said first and second transmission output shafts.

4. A transmission according to claim 2, in which said additional output shaft is in axial alignment with said driving transmission output shaft, and in which that end of said additional transmission output shaft which faces in the direction toward said driving transmission output shaft is hub-shaped and positively engaged by said driving transmission shaft.

5. A transmission according to claim 4, which includes a synchronizing disc arranged between the end face of said driving transmission output shaft and the surface portion faced thereby of said hub-shaped end.

6. A transmission according to claim 2, in which said additional output shaft forms part of a gear transmission.

* * * * *